United States Patent [19]

Van Wyk et al.

[11] Patent Number: 4,906,110
[45] Date of Patent: Mar. 6, 1990

[54] SOLID-LUBRICANT BEARING

[75] Inventors: Jan W. Van Wyk, Kirkland; David A. Zornes, Redmond; Bruce L. Zornes, Bothell, all of Wash.

[73] Assignee: Balanced Engines, Inc., Bothell, Wash.

[21] Appl. No.: 224,993

[22] Filed: Jul. 27, 1988

[51] Int. Cl.⁴ .............................................. F16C 33/37
[52] U.S. Cl. ...................... 384/463; 384/492; 384/551; 384/565
[58] Field of Search ............... 384/551, 492, 907.1, 384/913, 463, 522, 553, 565

[56] References Cited

U.S. PATENT DOCUMENTS

| | | | |
|---|---|---|---|
| 249,948 | 11/1881 | Kaufman | 384/551 |
| 260,585 | 7/1882 | Marston | 384/551 |
| 825,956 | 7/1906 | Bowie | 384/551 |
| 3,356,427 | 12/1967 | Van Wyk | 384/463 |
| 4,634,300 | 1/1987 | Takebayashi et al. | 384/492 |

Primary Examiner—Lenard A. Footland
Attorney, Agent, or Firm—Seed and Berry

[57] ABSTRACT

A bearing unit has rolling elements separated by floating solid-lubricant spacers which interfit with the roller elements. When the rolling elements are rollers, the ends of the rollers are lubricated by solid lubricant caps on the rollers, or by end portions of the spacer which overlap the roller ends, or by end ring members of solid-lubricant material. If the bearing unit includes a cage, floating solid-lubricant spacers are located between the cage dividers and the rolling elements.

18 Claims, 12 Drawing Sheets

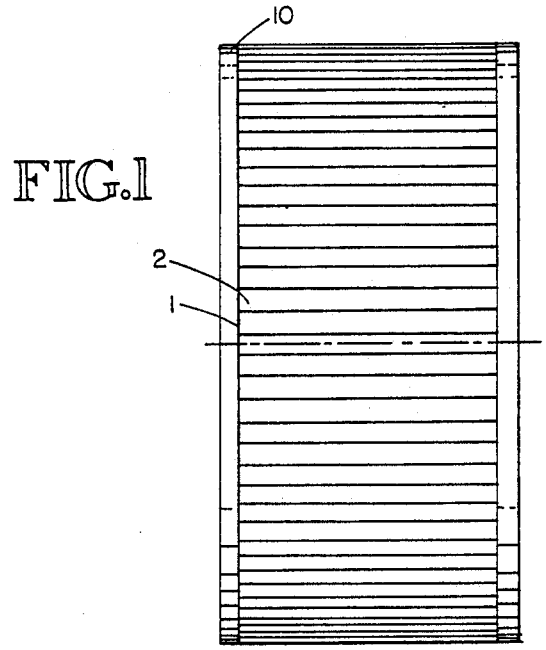
FIG.1
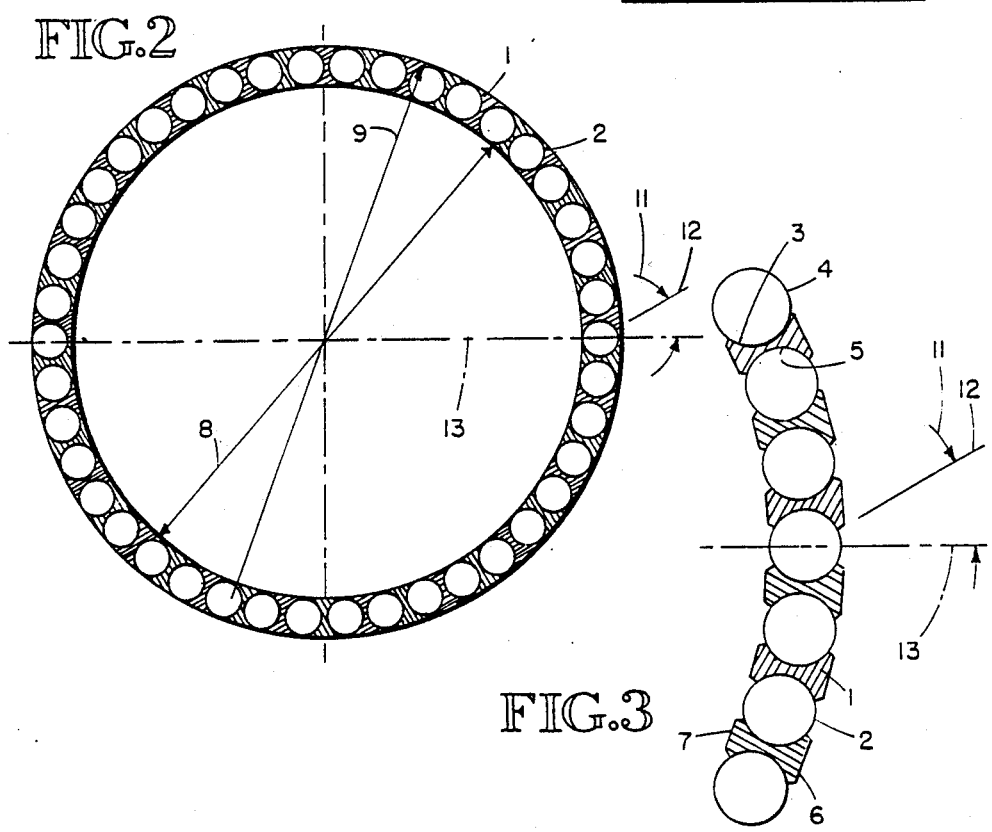
FIG.2
FIG.3

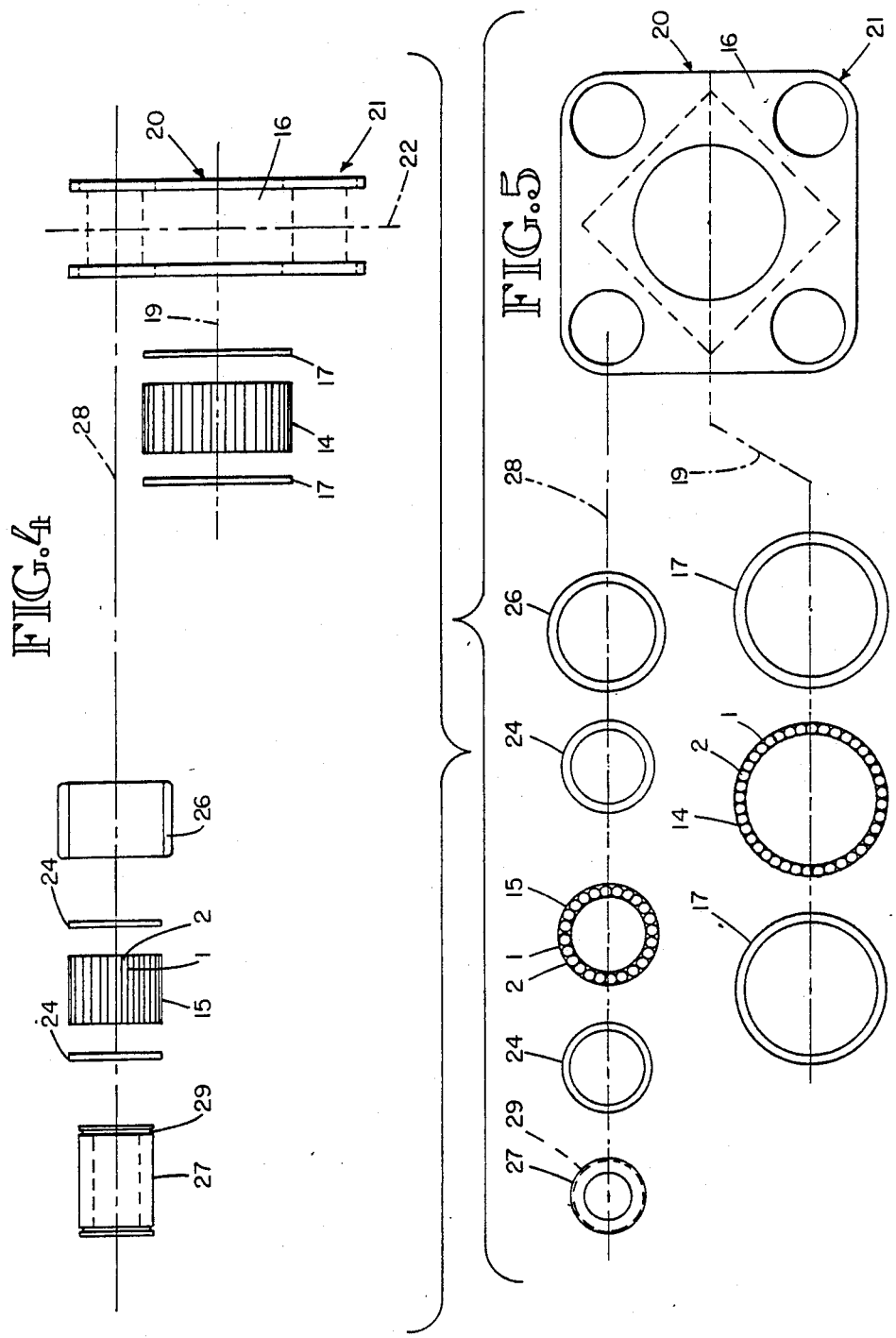

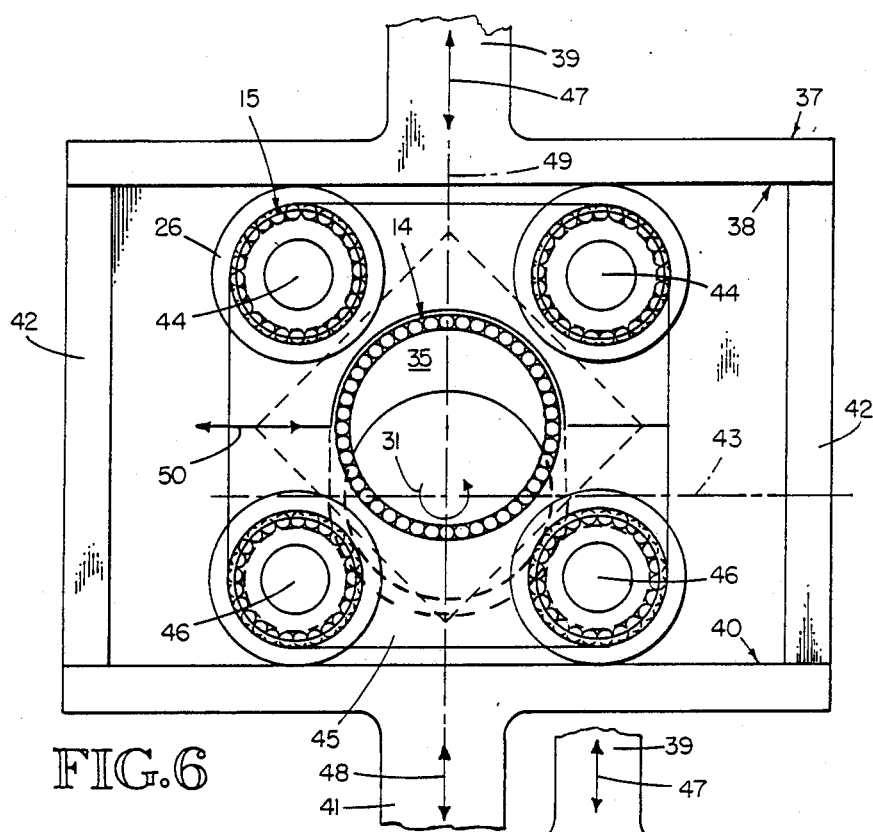
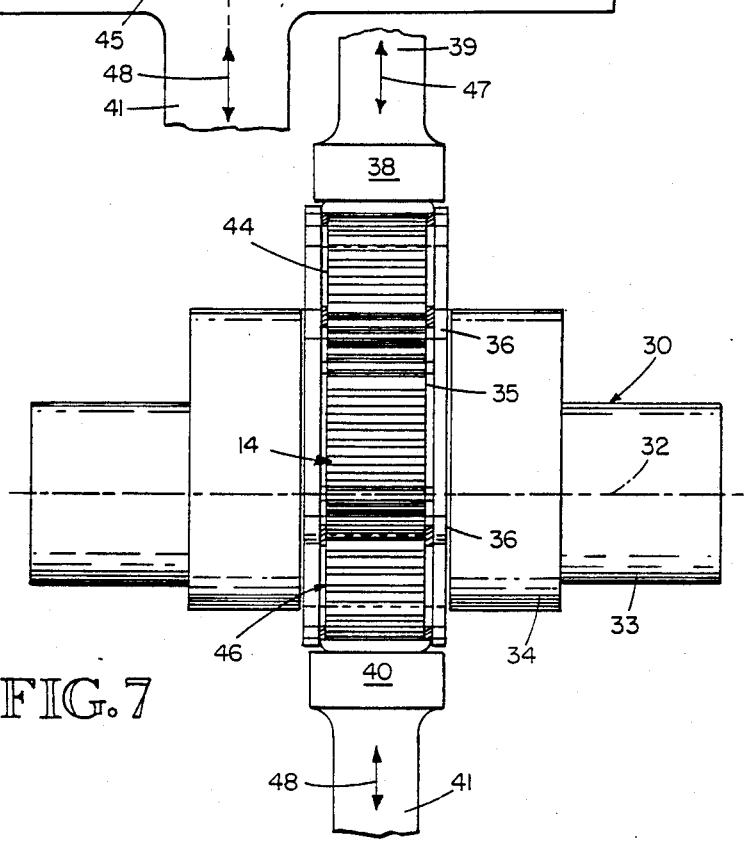

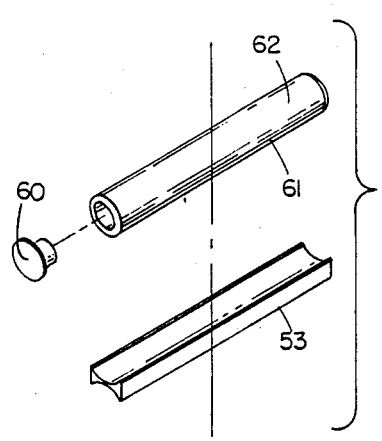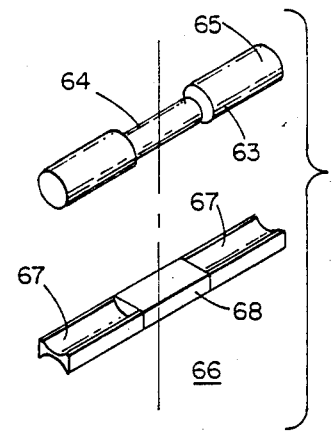
FIG.12　　　　　FIG.14
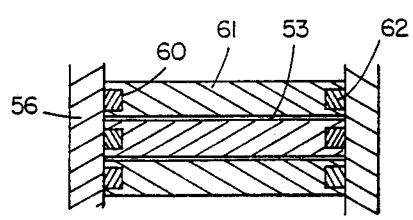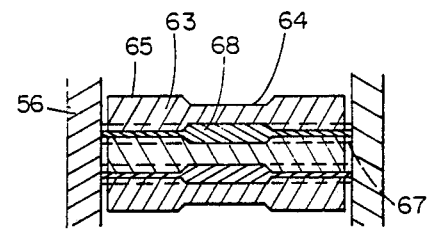
FIG.13　　　　　FIG.15
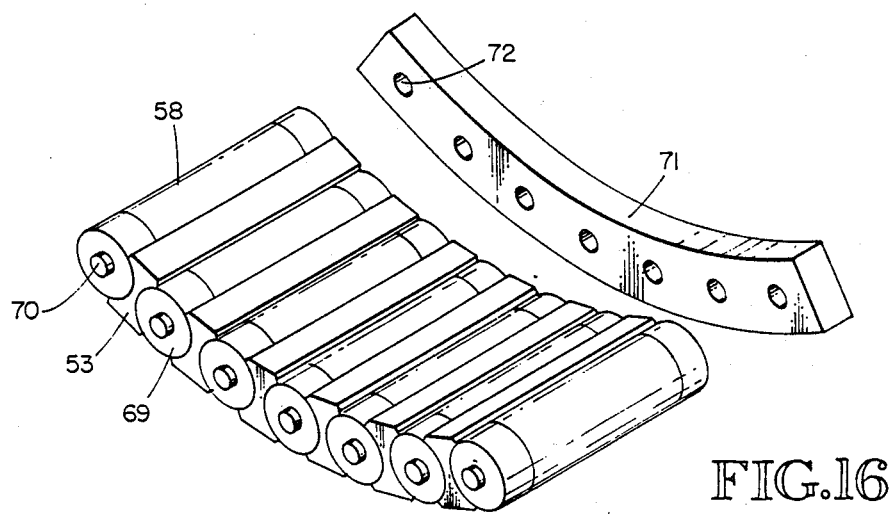
FIG.16

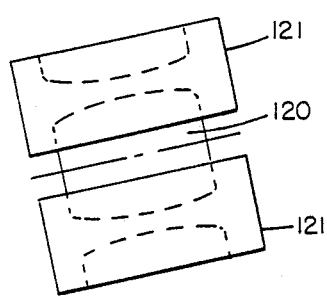
FIG.32
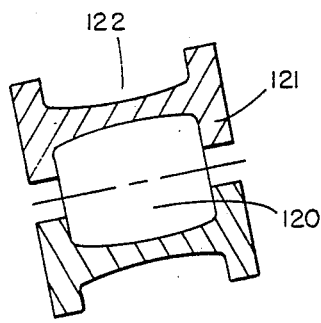
FIG.33
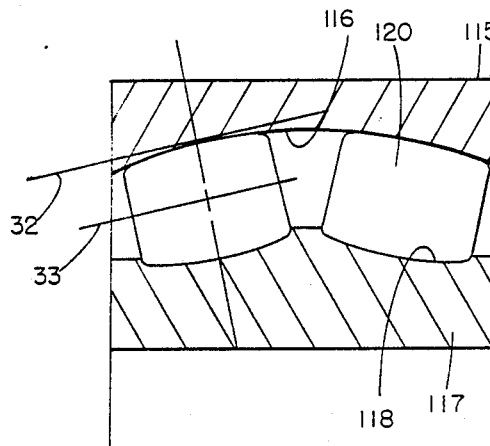
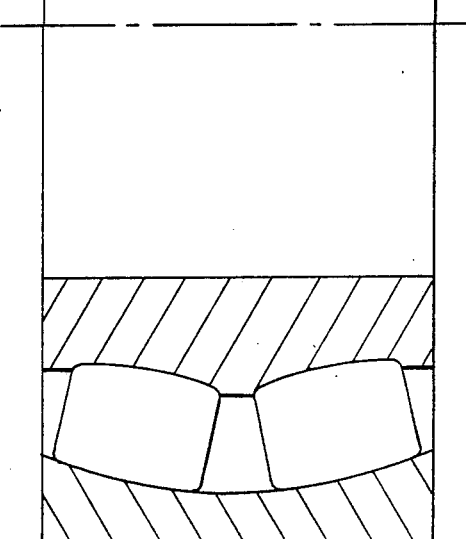
FIG.31

SOLID-LUBRICANT BEARING

TECHNICAL FIELD

This invention relates to self-lubricating bearings of the type in which the rolling elements are lubricated by transfer from spacers containing solid lubricants.

BACKGROUND ART

Patent No. 3,356,427 discloses solid-lubricant bearings in which the rolling elements are separated by spacers containing a solid lubricating material, primarily molybdenum sulfide. The spacers are mounted on pins extending through the spacers and connected at their ends to two cage rings. Hence the location of the spacers is fixed relative to the cage, and, as wear occurs, contact between the rolling elements and the trailing spacers decreases. Another shortcoming arises by way of the inner races having confining annular flanges contacted by the rolling elements. Hence, when the rolling elements are cylindrical rollers, for example, the roller ends contact the race flanges without lubrication being provided to the roller ends by contact thereof with the lubricating spacers. The design of the spacers is also such that there is virtually only line contact between the circumference of the rolling elements and the lubricating spacers.

Thus, although the self-lubricating bearing disclosed in Patent No. 3,356,427 was an important step forward in the bearing art, it has shortcomings. These shortcomings are magnified when the bearings are subjected to high-temperature operating conditions, particularly when the bearing are subjected to repeated rotational reversals under load. They are also magnified when the resulting thermal expansion of the races as compared to that of the other parts results in expansion of the clearance between the rolling elements and spacers.

DISCLOSURE OF THE INVENTION

The present invention aims to improve the construction, manufacture, assembly time, cost, and life of solid-lubricant bearings and to improve both the thermal and load-carrying capability of the bearings in the absence of fluid lubrication. A further objective is to provide bearings which will function well at high speed and when subjected to very high acceleration and compression forces or when operating under repeated reversals of direction.

In carrying out the present invention, solid-lubricant spacers are contoured in accordance with the profile of the rolling elements so that the area of contact therebetween is significantly increased. Furthermore, by the invention, the ends of the roller elements contact only solid-lubricant surfaces. This is accomplished, for example, in the case of needle bearings, by providing the ends of the rollers with solid-lubricant caps or by confining the needles between a pair of lubricating spacers which have opposed concave recesses fitting collectively over a major part of the circumference and ends of the needles. The latter design also permits axially aligned rollers having end-to-end contact to be used rather than a single roller, and hence makes it feasible to construct longer bearings, particularly when ceramic rollers are to be used.

Ceramic rollers have the advantage of significantly longer life and resistance to distortion, and the present invention also utilizes to advantage their extremely low thermal expansion characteristic by providing lubricating spacers having a relatively high thermal expansion sufficient to compensate for the thermal expansion of steel races to thereby maintain close tolerances between the lubricating spacers and the rolling elements through a wide temperature range. This is accomplished by forming the spacers from a suitable polyimide resin functioning as a matrix to contain selected solid lubricants. As part of this invention, the spacers are pressure formed from powder around duplicates of the rolling elements with which they are to be used and are then sintered, thereby keeping machining operations to a minimum while perfectly matching the concave lubricating faces of the spacers with the rolling elements. By choosing the proper resin and solid lubricants, bearings can be made which will operate at the high temperatures required, for example, for new designs of engines having a diabatic Diesel or Stirling cycle operation.

As a significant part of the present invention, the lubricating spacers are permitted to float relative to the rest of the bearing structure rather than being retained on pins between cage rings. This is made possible by the contouring of the lubricating surfaces of the spacers to match the shape of the rolling elements. Hence, the cage can be eliminated. This makes it possible to increase the number of rolling elements for a given bearing size and thereby increase the load capacity of the bearing.

Fluid-lubriated bearings with cage construction can be converted to solid-lubricant bearings by positioning lubricating spacers between the cage dividers and the rolling elements. In such a conversion, instead of there being a single lubricating spacer between adjacent rolling elements as in a non-cage bearing made according to this invention, there are, in effect, two spacer halves separated by a cage divider.

When a cage is used, the lubricating spacers may be spring-loaded toward the rolling elements by springs placed between the spacers and the cage dividers, and when a cage is not used, spacer halves can be urged apart toward respective adjoining rolling elements by springs between the spacer halves. In this regard, when conical lubricating spacers are used for conical bearings, the spacers can be split transversely and the two segments spring-loaded apart. Also, the spacers of this invention may be fabricated as a series of independent segments with a given modular length which can be assembled end to end for different sizes of bearings.

The invention is applicable to bearings with rolling elements of a great variety of sizes and shapes, such as cylinders, cones, barrels, and balls. Furthermore, bearing elements made in accordance with the invention can operate along a variety of travel path configurations and can operate along a flexible surface by adapting to the changing surface profile.

BRIEF DESCRIPTION OF THE DRAWINGS

FIG. 1 is an exterior side view of a circular assembly of solid-lubricant spacers and roller elements in accordance with the invention;

FIG. 2 is an end view of the assembly of FIG. 1 with the annular ring removed;

FIG. 3 is a detailed end view taken as in FIG. 2;

FIG. 4 is an exploded side view of the elements of a Scotch yoke assembly embodying the present invention;

FIG. 5 is an exploded front view of the elements and assemblies of FIG. 4;

FIG. 6 is a front view of the Scotch yoke in assembled condition;

FIG. 7 is a side view of the assembly of FIG. 6;

FIG. 12 is an exploded isometric view of a fourth embodiment of spacer and idler elements;

FIG. 13 is a partial front sectional view of a bearing assembly using the elements of FIG. 12;

FIG. 14 is an exploded isometric view of a fifth embodiment of spacer and roller elements;

FIG. 15 is a partial front sectional view of a bearing assembly using the elements of FIG. 14;

FIG. 16 is an isometric exploded view of a floating bearing segment embodiment;

FIG. 31 is a transverse cross-sectional view of a self-aligning bearing embodying this invention;

FIG. 32 is a fragmentary elevational view with the other race removed taken as indicated at 32 in FIG. 31;

FIG. 33 is a detail cross-sectional view taken as indicated at 33 in FIG. 31;

BEST MODE FOR CARRYING OUT THE INVENTION

Figure 8:
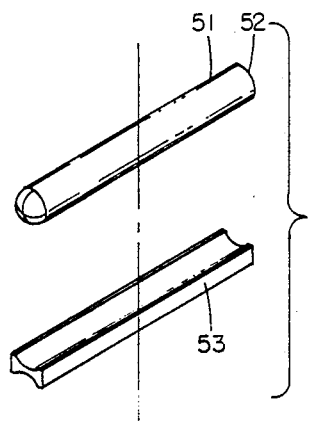
FIG. 8 is an exploded isometric view of a second embodiment of spacer and roller elements.

Referring to FIGS. 1–2, in accordance with the present invention; floating spacers 1 having a solid lubricant composition separate an equal number of rolling needle elements 2. Each spacer 1 is machined or molded to provide concave opposite sides 3, 5 with a curvature matching the outer surface 4 of the needle rolling elements 2 to provide a large contact area for solid-lubricant transfer and to minimize the unit pressure at the roller/spacer contact, thereby minimizing the wear of the spacer 1. The outer and inner surface 6, 7 of the spacers 1 may be molded or machined with a convex curvature to conform, respectively, to that of the inner and outer raceways, as determined by diameters 8, 9, or the surfaces 6, 7 may be planar and have two-line contact along the longitudinal edges of outer surface 6 with the outer raceway and single-line tangential contact with the inner raceway midway between the longitudinal side edges of inner surface 7. End lubrication of the rolling elements 2 may be accomplished by annular rings 10 of solid lubricant material adjacent the ends of the needle element 2 and spacers 1.

FIG. 3 illustrates a preferred form of the spacer elements 1 in which a recess angle 11 is machined or molded from the edges thereof along a plane 12 passing through the center axis of the adjoining rolling elements 2. This recess angle 11, as measured with respect to a plane 13 passing through the rotary axis of the bearing and the rotary axis of the adjoining rolling element, typically has a value of 30 degrees and will ensure that wear particles separated from the spacer are of minimum size so as not to interfere with the smooth operation of the bearing. The recess angle 11 also serves to recapture small, loose wear particles of transfer lubricant and consolidate the particles back into the body of the spacer under the compressive action occurring between the rolling elements and the spacer with respect to the apex of the recess angle.

FIGS. 4 and 5 are exploded side and front view of a Scotch yoke bearing block assembly utilizing bearings made in accordance with this invention. A main central bearing 14 and four track roller bearings 15 are assembled into a bearing block housing 16. The rolling elements 2 of the main bearing 14 are provided with annular end rings 17 of solid lubricant material to provide lubrication for the roller ends when assembled into bearing block housing 16 along axis 19. The bearing housing 16 consists of two mating halves 20, 21 which are symmetrical about axis 22 and are affixed to each other along the geometric plane containing axis 19.

Similarly, the track roller bearings 15 are each provided with a pair of annular rings 24 to provide end lubrication of the rolling elements 2. An outer race 26 for each bearing 15 is machined as a single piece and a single through-pin 27 functions as the inner race. The latter is retained in the bearing block structure 16 along axis 28 by snap rings in external grooves 29 near the ends of the pin 27.

The described Scotch yoke assembly is designed for use in the absence of lubricating fluid, with two opposed pistons acting on a common crankshaft, and converts reciprocating motion into rotary motion. FIGS. 6 and 7 illustrate a bearing block assembly containing the main bearing 14 and four track-roller bearing assemblies 15 mounted on a typical crankshaft 30 which rotates about crankshaft axis 32. The crankshaft 30 has a main journal 33 attached by a web 34 on either side of a central crankpin 35. The central bearing assembly 14 uses the crankpin 35 as an inner raceway and the bearing housing as an outer raceway. A shoulder 36 provided on either side of the crankpin 34 adjacent to the webs 34 retains the means for end lubrication of the rolling elements.

The yoke frame 37 comprises an upper slide bar 38 which is affixed to upper piston support structure 39, a lower slide bar 40 which is affixed to lower piston support structure 41, and frame legs 42 located on either side of the crankshaft center axis 43 to rigidly affix the upper slide bar 38 to the lower slide bar 40. The two upper track rollers 44 of bearing block 45 act on the upper slide bar 38 of yoke frame 37, and similarly, the two lower track rollers 46 act on lower slide bar 40. The forces from the opposed pistons are transmitted through piston support structure 39, 41 to the bearing block assembly and to the crankpin 35, which generates a rotational moment about the crankshift axis 32. As a result, the Scotch yoke frame 37 reciprocates in upward and downward 47, 48 directions along central axis 40. The crankpin rotation 31 causes the bearing block to rotate with a fixed orientation relative to the crankshaft axis and to translate in either direction 50 with respect to the Scotch yoke frame 37. The combined action causes the rolling elements 2 of the central bearing 14 to rotate in one direction while the rolling elements of the four track roller bearings 15 reverse direction according to a sinusoidal relationship at least once each cycle of crankshaft rotation.

Reduction of the mass of the roller elements, particularly those which are subject to reversal of motion, is desirable to reduce inertia effects and resulting self-heating. The inertia force resisting the direction change or acceleration is proportional to the mass of a given geometry, with heavier components exhibiting more inertia or increased resistance to change of velocity vector. Reduction of the mass of the rolling elements can be accomplished by choosing materials which have a lower mass density than steel, as, for example, ceramic materials such as silicon nitride, silicon carbide composites, alumina titanates, glass ceramic dispersion composites, metal matrix composites, and suitable light alloys.

Figure 9:
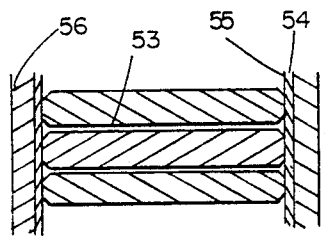
FIG. 9 is a partial front sectional view of a bearing assembly using the elements of FIG. 8.

FIGS. 8 and 9 illustrate a means for end lubrication using modified needle rolling elements 51 formed with spherical ends 52 and using transfer lubricant spacers 53 like spacers 1 to separate rolling elements 51. Only the crowns of the spherical ends 52 contact annular lubricating rings 54 so that there is a minimum of contact with the inner faces 55 of the annular rings 54. End walls 56 of the bearing retain the rings 54. If the spacers 53 are made slightly longer than the rolling elements and lubricating rings 54 are not used, then a wiping action of the ends of the spacers 53 directly against the bearing end walls 54 occurs which deposits a lubricant film on the inner faces of such bearing end walls.

Figure 10:
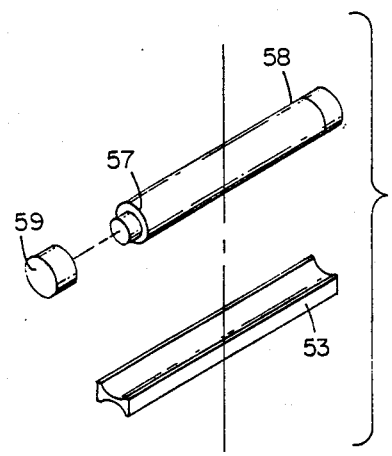
FIG. 10 is an exploded isometric view of a third embodiment of spacer and roller elements.
Figure 11:
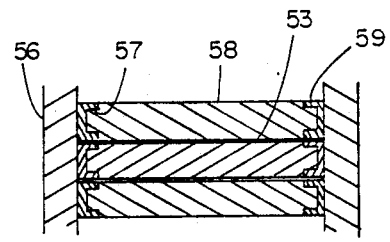
FIG. 11 is a partial front sectional view of a bearing assembly using the elements of FIG. 10.

FIGS. 10-13 illustrate fully floating and segmented means for roller element end lubrication which is independent to the size of the overall bearing race diameter. FIGS. 10 and 11 illustrate an end cap arrangement wherein the ends of roller elements 58 are necked to provide annular shoulders 57. FIGS. 12 and 13 illustrate an end button arrangement wherein an axial hole 60 is provided in each of roller element 61 and lubricating end buttons 62 made of solid lubricating material are fitted into the holes 60 and project beyond the ends of the roller elements 61. The end caps 59 and end buttons 61 are preferably loosely fitted with the respective roller elements 58, 61 so as to be free to turn relative to the roller elements as they move therewith. As the bearing of FIGS. 10-11 operates, lubricating transfer film may develop between the inner face of the end caps 59 and the ends of the roller elements 58, and between the outer end surface of the end cap 59 and the bearing end walls 56. The lubricating end buttons 62 behave similarly to the end caps 59. The free-floating characteristic of the end caps 59 and end buttons 62 with respect to the bearing end walls 56 is ideally suited for solid-lubricated, recirculating track rollers and for flexible tracks, particularly where the track path is noncircular.

FIGS. 14 and 15 illustrate an arrangement of fully floating roller and spacer elements which do not require means for roller end lubrication. Roller elements 63 have a central annular recess 64, and the roller ends 65 are constrained by segmented lubricating spacers 66 from contacting the bearing end walls 56. Each spacer 66 comprises three parts, two identical outer segments 67, similar to spacers 53 (described earlier) but shorter in length, and a middle part 68, which is shaped to fit within the central annular recess 64 of the roller elements 63. The overall length of the spacers 66 is slightly longer than the roller elements 63 to ensure occurrence of a gap between the roller ends 65 and the bearing end walls 56. The middle segment 68 of the spacers 66 interfits with the roller elements 66 at the central recesses 64, such as to cause the roller elements 63 to maintain alignment and position. The three segments of the spacers 66 may be manufactured from one continuous length of stock material; however, control of spacer dimensions to match the profile of the roller elements 63 is easier to accomplish by individually fabricating spacer segments, particularly when high-speed fabrication processes are used.

FIG. 16 illustrates an assemblage of spacers 53 and roller elements 58 fitted with modified end caps 69 having integral outer positioning pins 70 which are aligned and retained by a segmented ring retainer 71. The positioning pins 70 on the end caps 69 fit loosely into oversized holes 72 formed in the ring segment 71. The ring segment 71 is a modular part of a full ring such as ring 10, and is provided for the purpose of grouping an assemblage of spacers 1, roller elements 2, and end rings 10 (FIG. 1) for ease of manufacture and assembly. As an example, a bearing assembly having a total of forty-two rollers and an equal number of spacers forming a complete circle when viewed on end may comprise an assemblage of six units of seven roller elements, six spacers, and two end segments 71 each, with each of the six units separated from one another by six additional spacer elements. With such an arrangement, ease of manufacture is achieved, since final assembly of a full bearing involves handling only six of these units and six individual spacers rather than the need for individually handling eighty-four roller elements and spacers during the final construction process.

Figure 17:
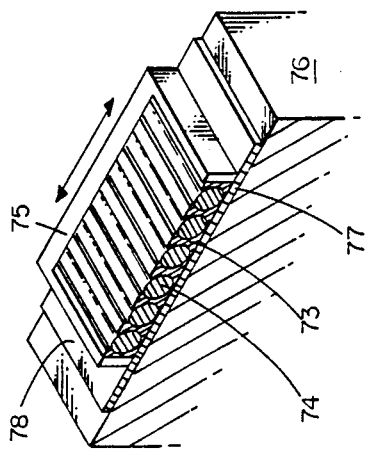
FIG. 17 is an isometric view illustrating an oscillating, linear-track bearing block embodiment.

FIG. 17 shows a linear-track bearing assembly in which roller elements and lubricating spacers are held in position by a bearing retainer clip. In this assembly, a group of lubricating spacers 73 and roller elements 74, and two half spacers 77, is positioned in a U-shaped retainer clip 75 and acts in conjunction with a bottom plate 78 on a linear track.

Figure 18:
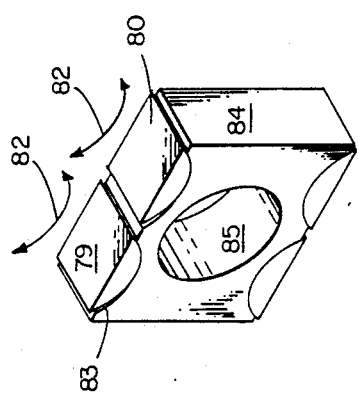
FIG. 18 is an isometric view illustrating a floating-wedge bearing block embodiment for Scotch yoke mechanisms.

FIG. 18 illustrates a solid-lubricated, floating-wedge type of bearing block for applications requiring a low-mass, light-load Scotch yoke mechanism. The floating wedges 79 are machined or molded from solid lubricant material with a flat outer face 80 and a curved back face 81 such that each floating wedge has rotational freedom 82 relative to a curved recess 83 in bearing block body 84. For applications using a crankshaft in the central bore 85 of the bearing block, a bearing between the crankshaft and the bearing block utilizing roller elements and lubricating spacers like those previously described would be used.

Figure 19:
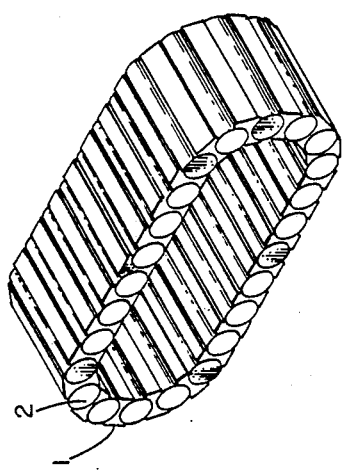
FIG. 19 is an isometric view illustrating an endless-track bearing block assembly incorporating the invention.

Applications requiring a solid-lubricated, high-load, high-life bearing but constrained by weight and overall dimensions may benefit from an endless track assembly which achieves less weight and size than a corresponding track roller assembly. FIG. 19 shows such a track assembly comprising roller elements 2 and lubricating spacers 1. These would be housed in a suitable bearing block structure.

Figure 20:
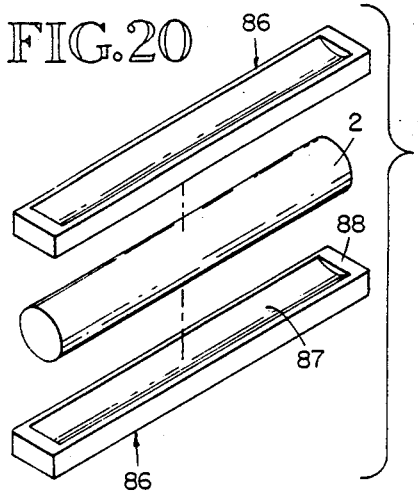
FIG. 20 is an exploded isometric view of a preferred spacer and roller arrangement.
Figure 21:
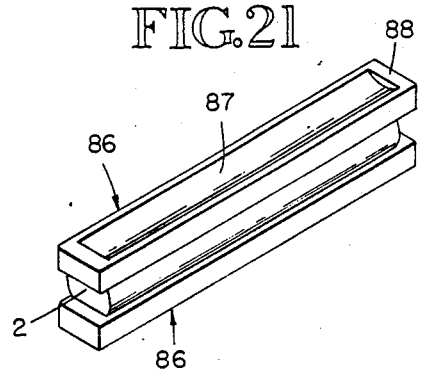
FIG. 21 shows the exploded parts of FIG. 20 in assembled relation.

Rather than lubricating the ends of the rollers by providing solid-lubricant end members wiped by the roller ends (FIG. 9) or providing the rollers with end caps of solid-lubricant material (FIG. 10), the solid lubricant spacers may be shaped to provide elongated pockets on opposite sides closed at their ends, as shown by spacers 86 and pocket 87 in FIGS. 20–21. The pockets 87 are configured to have a radius of curvature corresponding to that of the rollers 2. The resulting interfit between the rollers 2 and spacers 86 (FIG. 21) retains the spacers and keeps them in proper lubricating relation to the rollers which are positioned between suitable raceways. With this arrangement, the ends of the rollers are lubricated by the end walls 80 of the pockets 87.

Figure 22:
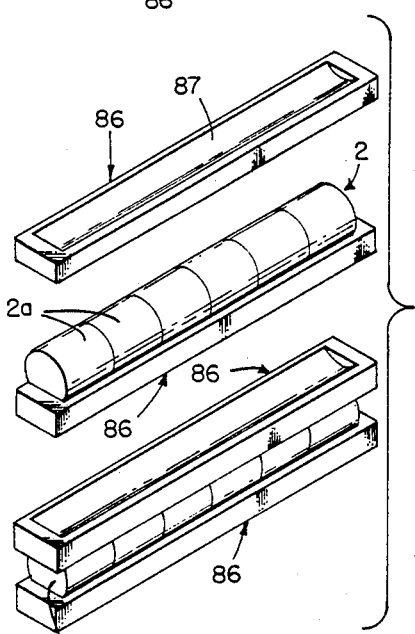
FIG. 22 is an exploded isometric view illustrating assembly of a modified form of the FIG. 21 embodiment.
Figure 23:
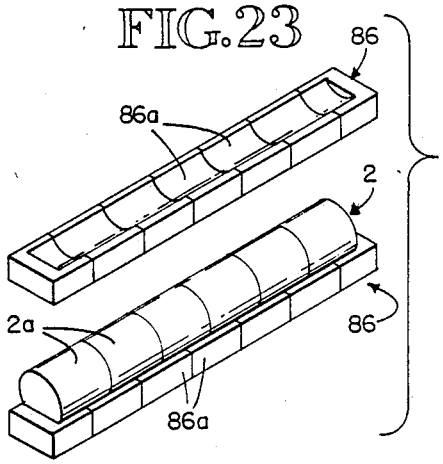
FIG. 23 is an exploded isometric view showing a further modification from the FIG. 21 embodiment.

There is a practical manufacturing limitation on the length of ceramic cylindrical rollers (needles) for bearings. As shown in FIG. 22, by the present invention it is practical to place a series of ceramic rollers 2a end-for-end to operate in effect as a single roller. This is best accomplished by use of the spacer configuration 86 in which the spacer has an elongated pocket closed at its ends which will confine two or more rollers 2a. Similarly, the solid-lubricant spacers can be fabricated as a series of segments 86a of a specified modular length, and can be used with roller segments 2a preferably arranged so that the ends of the roller segments are located midlength of the spacer segments 86a, as shown in FIG. 23.

Since an assembly of the lubricating spacers and roller elements as previously described is flexible, it can take not only the form of a ring (FIG. 2), an endless track (FIG. 19), or a linear segment (FIG. 17), but a variety of other configurations such, for example, as may be required for a flexible conveyor belt having changing curvatures. In such an instance, the embodiment of FIG. 10 may be used and a small diametric hole made in the end caps 59 of the roller elements 58 and a registering hole made in the lubricating spacers 53. A cable or monofilament line can subsequently be fed through the holes, thereby linking all the components.

Figure 26:
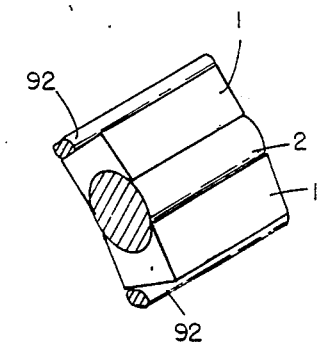
FIG. 26 is a transverse sectional detail view of a portion of FIG. 25.
Figure 25:
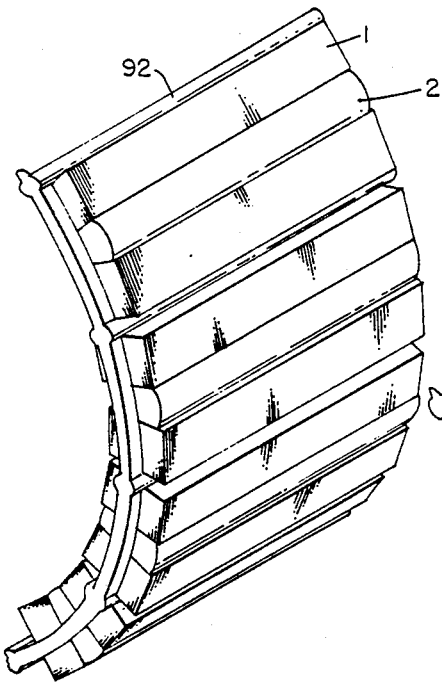
FIG. 25 is a fragmentary perspective view of the cage with spacers and rollers installed in accordance with this invention.
Figure 24:
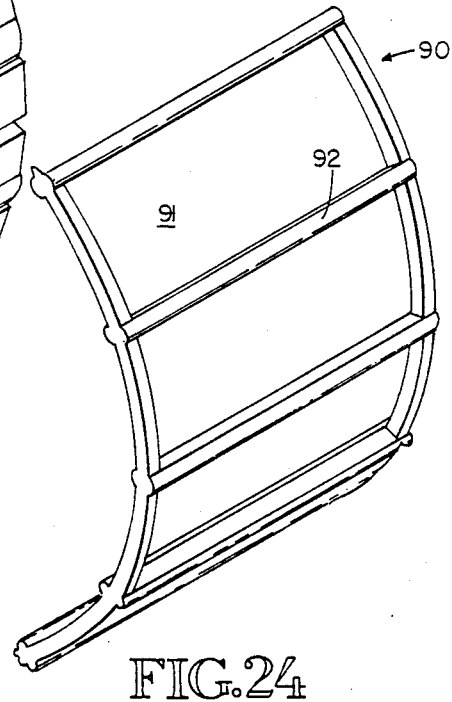
FIG. 24 is a fragmentary perspective view of a cage.

Referring to FIGS. 24–26, although not preferred, the present invention may be incorporated with a cylindrical cage 90 having a circumferential series of elongated slots 91, each occupied by a roller element 2 and a pair of floating lubricating spacer elements 1. The back side of the spacers may be flat or shaped otherwise to engage the dividers 92 between the cage slots 91. This cage arrangement may be advantageous for installations in which relatively few roller elements are required to handle the load, thereby making it desirable to increase the effective width between the roller elements.

Figure 27:
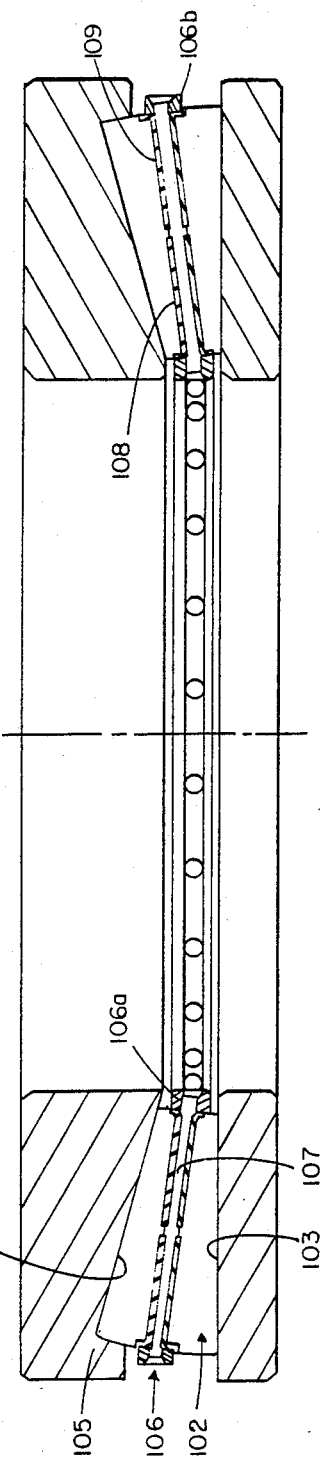
FIG. 27 is a transverse sectional view through a thrust bearing modified to embody this invention.

FIG. 27 illustrates the invention applied to a V-flat type of thrust bearing in which tapered rollers 102 operate between a circular flat raceway 103 opposed by a conical raceway 104. The annular member providing the conical raceway 104 has a lip 105 to resist the radial component of the thrust force caused by the inclination of the conical raceway and to guide the rollers. Lines extending from the roller-to-raceway contact surfaces converge to form a cone. The vertex of this cone is common with the center line of the bearing and the place of the flat raceway. To maximize bearing capacity, commonly V-flat bearings utilize cages 106 with hardened pins 107 passing through the center of the rollers 102 rather than dividers between the bearings. As shown in FIG. 27, these pins extend between inner and outer cage rings 106a, 106b of the cage.

Figure 30:
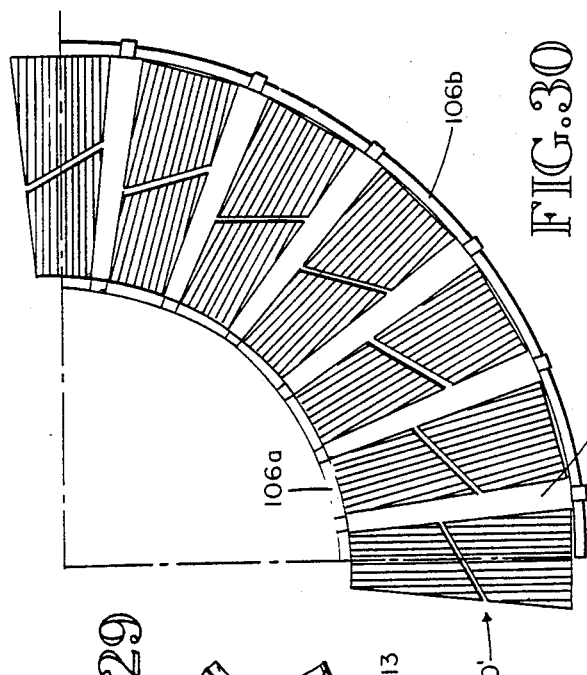
FIG. 30 is a fragmentary plan view of the thrust bearing with the top race removed.
Figure 29:
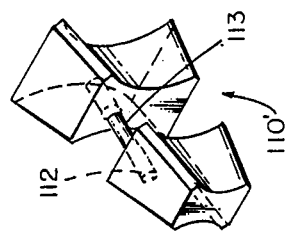
FIG. 29 is a perspective view of a modified spacer for the bearing of FIG. 27.
Figure 28:
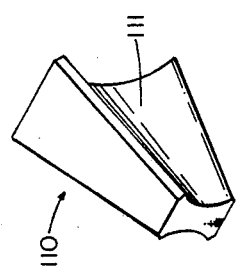
FIG. 28 is a perspective view of a spacer in the thrust bearing of FIG. 27.

In accordance with this invention, the tapered rollers 102 are separated by tapered, floating, solid-lubricant spacers 110 and the pins 107 are provided with inner and outer self-lubricating sleeve components 108, 109 having enlarged annular heads between the ends of the tapered rollers and the cage rings. As shown in FIG. 28, the tapered spacers 110 have concave faces 111 to interfit with the tapered rollers. The spacers may be a single piece, as shown in FIG. 28, or may be split, preferably on a bias, as indicated by spacers 110′ in FIGS. 29, 30. If the spacers are split, the two sections of each spacer 110′ may be formed with aligned bores 112 for receiving a compression spring 113 serving to urge the spacer sections apart in the endwise direction. Since the spacer sections and rollers are tapered, the spreading action of the springs 113 tends to keep the spacer sections in engagement with the rollers.

As shown in FIG. 31, the invention is also applicable to self-aligning spherical roller bearings having their outer ring 115 formed with a spherical raceway 116 and their inner ring 117 formed with a pair of channel raceways 118 shaped to receive a respective set of barrel rollers 120 conforming in profile to the outer spherical raceway 116. The barrel rollers of each set are separated from one another by spacers 121 with solid-lubricant material having recesses (pockets) 122 to receive the full length of adjoining rollers 120 and partly cover their ends. As a result, the barrel rollers 120 are lubricated throughout their contact surface with the raceways 116, 118 and the spacers 121 are held in proper position.

Figure 34:
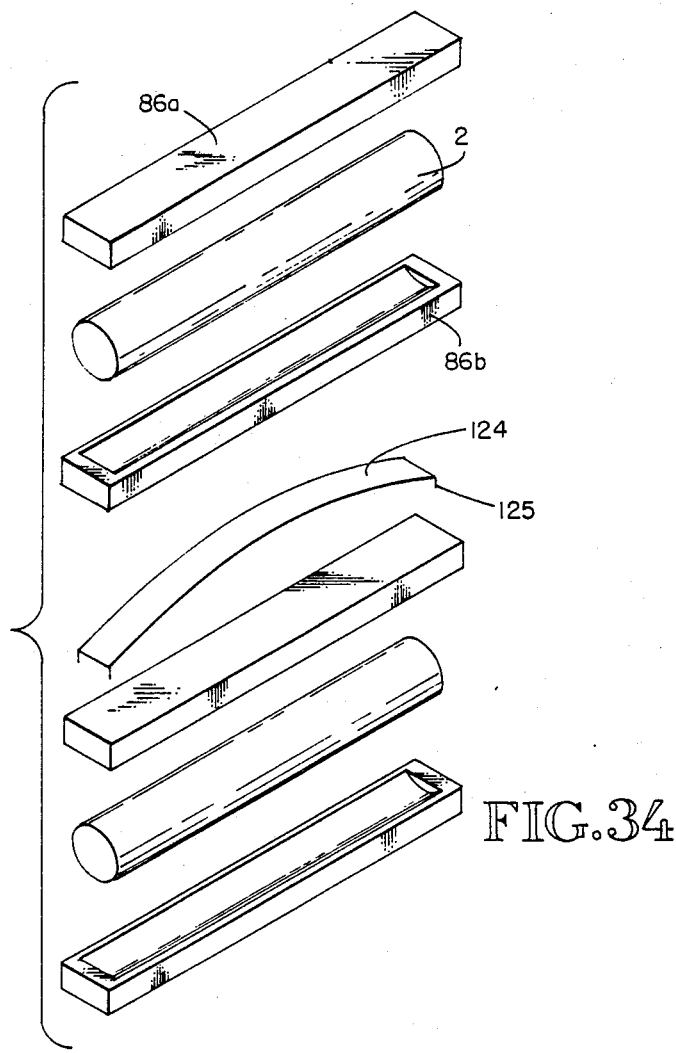
FIG. 34 is an exploded isometric view showing an embodiment using leaf springs.
Figure 36:
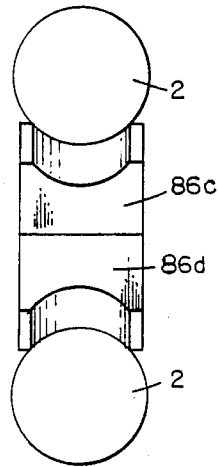
FIG. 36 is an end view of the FIG. 35 arrangement.

Instead of unitary spacers between rollers the spacers 86, for example, may be longitudinally split in half, as shown in FIG. 34, so that the two resulting spacer sections 86a, 86b are back-to-back. The two spacer sections can then be biased apart into engagement with the adjoining rollers 2 by suitable springs, as for example, leaf springs 124 which may have prongs 125 for biting into the bakc of the spacer sections. When a cage is used presenting dividers between slots in which rollers and self-lubricating spacers are used in accordance with this invention, the spacers can be spring biased toward the rollers by leaf springs, for example, between the cage dividers 92 and the back of the spacers.

Figure 35:
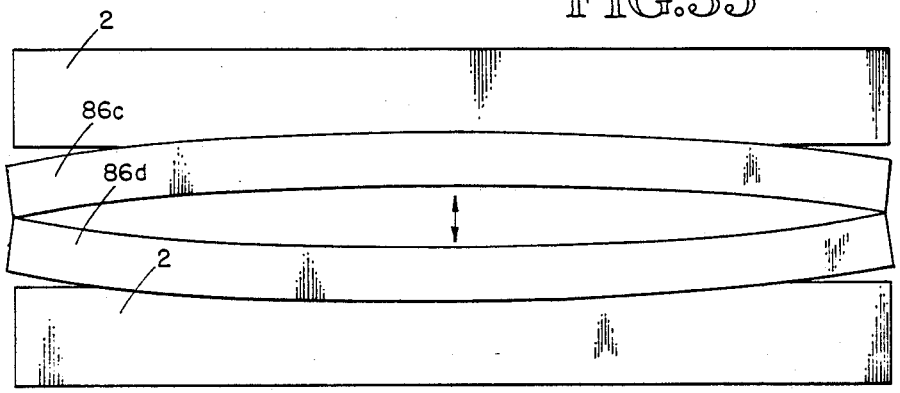
FIG. 35 is a side elevational view showing an arrangement in which the spacers have a spring effect.
Figure 38:
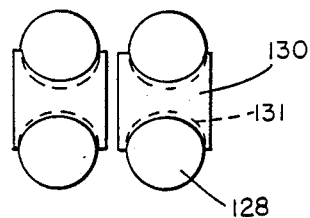
FIG. 38 is a detail plan view with the outer race in FIG. 37 removed.

As indicated in exaggerated form in FIG. 35, instead of having the two back-to-back parts 86a, 86b of the spacers separated by springs, two complementing solid-lubricant spacer parts, 86c, 86d may be arched oppositely when relaxed so as to have a spring effect when assembled in interfitting relation with the rollers.

Figure 37:
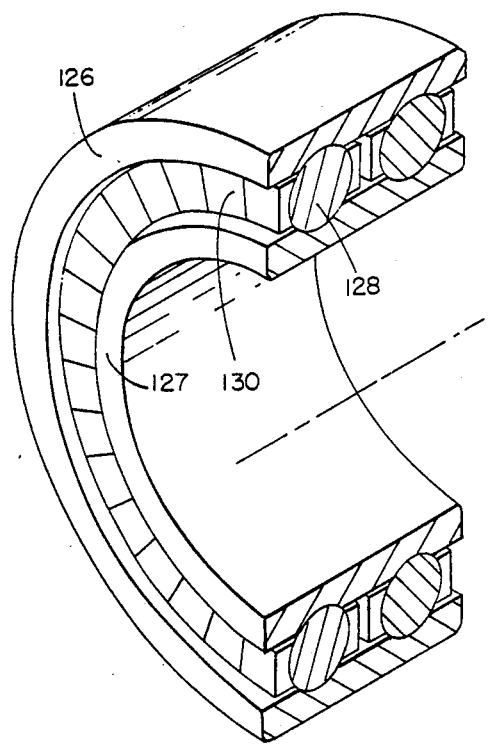
FIG. 37 is a perspective transverse cross-sectional view of a ball bearing assembly made in accordance with this invention.

The present invention is not only applicable to bearings with needle rollers, tapered rollers, barrel rollers and other elongated rollers, but is also applicable to ball bearings. An example is shown in FIG. 37 where inner and outer races 126, 127 are grooved to receive two side-by-side sets of balls 128. The balls in each set are separated by self-lubricating spacers 130 formed with concave spherical pockets 131 to fit over part of the circumference of the related balls. When viewed from the ends of the bearing, the spacers are generally tapered inwardly in the direction of the inner raceway 127.

Figure 39:
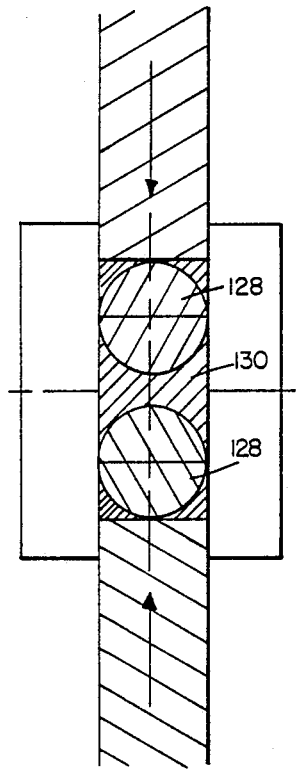
FIG. 39 illustrates a system for making spacers for the ball bearing assembly of FIG. 37.

FIG. 39 depicts a simple form of die or mold for shaping ball bearing lubricating spacers. The die in its simplest form consists of a mold cavity enclosed on either side by a ball bearing adjusted in size to allow for shrinkage. During a lubricant spacer forming operation a ball 128 is positioned in the bottom of the mold cavity. The mold cavity is then charged with a predetermined amount of polymer powder mixed with solid lubricant powder for a spacer 130. The other ball 128 is then positioned and the charge is compressed by a press acting on the balls. The mold may be heated during the pressing operation. The same technique can be used for shaping spacers for other shapes of roller elements.

The spacers may be made from Vespel ® SP-21 polyimide, a commercially available produce produced by the DuPont Company having U.S. Military Specification R46198. This product does not soften and is thermally resistant such that it can carry loads at temperatures beyond the reach of most plastic materials and do so while exhibiting very low creep. For example, when the product is subjected for 100 hours to loads of 2,500 psi at 572° F., the total deformation is only 1.2%. At the end of 600 hours under these load and temperature conditions the total deformation only increases to 1.6%. Vespel ® SP-21 has a polyimide matrix containing a dispersion of various solid lubricant substances such as graphite and Teflon ®. The spacers are made by high-pressure compaction of Vespel ® SP-21 powder and secondary sintering. Then the spacers are machined to dimension and tolerance. The highest strength and lowest thermal expansion are usually found in the direction perpendicular to the pressing direction. Vespel ® SP-211 may be used for spacers to be used at lower temperatures.

The embodiments of the bearing elements and assemblies described in this invention are designed to be operated in the absence of fluid lubricant. However, the addition of fluid is not excluded. Addition of a thin film from a spray or mist of fluid may increase the life of the solid-lubricated bearing design as described in this invention by causing a further reduction in the coefficient of friction between the rolling elements and transfer lubricant spacers, subject to the constraint that sufficient quantities of fluid are not present to cause transport of particles of solid lubricant spacer material away from the bearing assembly. Addition of a film of fluid into the bearing assembly may also reduce the temperature of the bearing.

To reduce thermal-induced stresses in the bearings of the present invention at high temperatures and to reduce loosening of bearing elements due to thermal growth, it is preferred to select the materials and dimensions of the bearing elements, particularly the solid-lubricant spacer, such that the net coefficient of thermal expansion of the median circumferential line of the bearing spacer and roller assembly closely matches the thermal expansion of the corresponding circumference of the bearing raceways through the range of temperatures expected during bearing operation. If the bearing spacer and roller assembly grows thermally to a larger diameter than the outer bearing raceway, a higher wear rate end self-heating of the bearing components will occur. On the other hand, if the bearing outer raceway grows thermally larger than the median diameter of the spacer and roller assembly, gaps will occur between individual roller and spacer elements and likely cause an increased bearing wear rate.

The thermal effects due to differing coefficients of thermal expansion of the bearing components may be mitigated by, for example, selecting materials such that the thermal expansion of a the assembly of rollers and lubricant spacers will closely match the coefficient of thermal expansion of a bearing raceway made of steel. This can be done by, for example, using rolling elements made of a ceramic material, such as silicon nitride, having a low thermal expansion coefficient as compared to transfer lubricant spacers made of a suitable polyimide with lubricant additives. Control of the effects of thermal expansion can also be accomplished by fabricating the bearing race and needle rollers from M50 tool steel and by making half of the spacers from a polymeric material, such as polyimide with lubricant additives, which has a higher coefficient of thermal expansion than M50 tool steel and making the other half of the spacers from a ceramic material, such as silicon nitride with lubricating additives, which has a thermal expansion lower than M50 tool steel. It will be appreciated that alternating such relatively low-expansion spacers and relatively high-expansion spacers in the bearing assembly will result in a net thermal expansion more closely matching the thermal expansion of the steel race than would be possible if either spacer set were exclusively used in the bearing assembly buildup.

Although we have shown and described specific embodiments of my invention, it will be apparent that many minor changes of structure and operation could be made without departing from the spirit of the invention as defined by the scope of the appended claims.

We claim:

1. A bearing assembly comprising:
a plurality of rollers arranged to roll on a path; and
a plurality of floating spacers between said rollers and concave shaped on opposite sides to interfit with the rollers and travel therewith on said path, said spacers being longer than said rollers and having a solid-lubricant composition.

2. A bearing assembly according to claim 1 in which said rollers and spacers are arranged in a circular configuration.

3. A bearing assembly according to claims 1 in which said rollers and spacers are arranged in an endless non-circular configuration.

4. A bearing assembly according to claim 1 in which said spacers and rollers float together.

5. A bearing assembly according to claim 1 in which said rollers track between inner and outer races and are confined at their ends by said spacers.

6. In a bearing assembly:
a spacer having a concave depression closed at opposite ends, said spacer having a solid-lubricant composition; and a roller having less than half of its circumference fitting into said depression, whereby the circumference and ends of the roll are lubricated by said spacer when the roller turns relative to the spacer.

7. A bearing assembly according to claim 6 in which said roller comprises a plurality of roller elements arranged end to end.

8. A bearing assembly according to claim 6 in which said roller comprises a plurality of roller elements arranged end to end.

9. A bearing assembly according to claim 6 in which said roller comprises a plurality of roller elements arranged end to end, and in which said spacer comprises a plurality of spacer elements arranged end to end.

10. In a bearing assembly:
    two adjacent spacers having opposed concave depressions, each closed at opposite ends, said spacers having a solid-lubricant composition; and
    a roller fitting into said depressions and having part of its circumference exposed, whereby the circumference and ends of the rollers are lubricated by said spacers when the roller turns relative to the spacers.

11. A bearing comprising:
    inner and outer members providing opposed inner and outer raceways;
    rolling elements between said raceways;
    spacers located between said raceways and separating said rolling elements, said spacers being free of interconnection with one another and having a solid-lubricant material for lubricating the rolling elements; and
    end lubricating means provided by said spacers for end lubricating the rollers by a transfer film of solid lubricant.

12. A self-lubricating bearing comprising a raceway; a plurality of spaced rollers tracking on said raceway, and a plurality of elongated spacers separating said rollers and confining them against movement endwise of the spacers, said spacers having a solid-lubricant composition.

13. A bearing assembly comprising:
    a plurality of round ceramic roller units arranged to roll on a path provided by a metal race; and
    a plurality of spacer units alternating with said roller units and concave shaped on opposite sides to interfit with the roller units through an arc along said path and travel therewith along said path, said spacer units having a polyimide matrix containing a solid-lubricant material.

14. A self-lubricated bearing comprising:
    an inner race;
    an outer race surrounding the inner race;
    rollers between said races;
    solid-lubricant spacers floating between said rollers and races, said rollers loosely interfitting with said spacers for holding them in position to lubricate the rollers by lubricant transfer from said spacers, the thermal expansion characteristic of the spacers and races being greater than that of the rollers, and the collective thermal expansion of the spacers approximating that of the races so that the interfit of the spacers and rollers remains approximately constant with changes in operating temperatures.

15. A self-lubricated bearing according to claim 14 in which said rollers are ceramic, said races are metal, and said spacers have a polyimide matrix containing solid-lubricant material.

16. A self-lubricated bearing according to claim 14 in which some of said spacers have a higher coefficient of thermal expansion than do others of said spacers.

17. A self-lubricated bearing according to claim 14 in which some of said spacers have a higher coefficient of thermal expansion than do said races, and in which other of said spacers have a lower coefficient of thermal expansion than do said races.

18. A bearing assembly comprising a plurality of elongated rollers each having a longitudinal center axis and arranged to roll on a path; and
    a plurality of elongated floating spacers between said rollers and concave shaped to interfit with said rollers and travel therewith on said path, said spacers having a solid-lubricant composition and having each of their outer edges recessed from the respective line of contact with the adjoining roller in a longitudinal plane, which forms a dihedral angle of approximately thirty degrees with a longitudinal plane which passes through the center axis of said adjoining roller and is centered relative to the respective ones of said spacers contacting such adjoining roller.

* * * * *

UNITED STATES PATENT AND TRADEMARK OFFICE
CERTIFICATE OF CORRECTION

PATENT NO. : 4,906,110

DATED : March 6, 1990

INVENTOR(S) : Jan W. Van Wyk et al.

It is certified that error appears in the above-identified patent and that said Letters Patent is hereby corrected as shown below:

In claim 8, column 11, line 9, delete "roller comprises a plurality of roller" and substitute therefor --spacer comprises a plurality of spacer--.

Signed and Sealed this

Fourteenth Day of January, 1992

Attest:

HARRY F. MANBECK, JR.

*Attesting Officer*　　　　*Commissioner of Patents and Trademarks*